United States Patent
Papadias

(10) Patent No.: US 6,654,719 B1
(45) Date of Patent: Nov. 25, 2003

(54) METHOD AND SYSTEM FOR BLIND SEPARATION OF INDEPENDENT SOURCE SIGNALS

(75) Inventor: Constantinos B. Papadias, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/525,541

(22) Filed: Mar. 14, 2000

(51) Int. Cl.[7] .......................... G10L 15/20; G10L 15/02
(52) U.S. Cl. ...................................... 704/233; 704/231
(58) Field of Search ............................... 704/200, 231, 704/246, 233; 600/310; 379/88.01, 88.02, 406.16; 706/22, 20; 708/300

(56) References Cited

U.S. PATENT DOCUMENTS

| | | | | |
|---|---|---|---|---|
| 5,623,539 A | * | 4/1997 | Bassenyemukasa et al. | 704/246 |
| 5,687,104 A | * | 11/1997 | Lane et al. | 708/300 |
| 5,706,402 A | * | 1/1998 | Bell | 706/22 |
| 5,999,956 A | * | 12/1999 | Deville | 708/300 |
| 6,002,776 A | * | 12/1999 | Bhadkamkar et al. | 379/406.16 |
| 6,185,309 B1 | * | 2/2001 | Attias | 381/66 |
| 6,343,268 B1 | * | 1/2002 | Balan et al. | 704/228 |
| 6,424,960 B1 | * | 7/2002 | Lee et al. | 600/310 |

* cited by examiner

Primary Examiner—David D. Knepper

(57) ABSTRACT

The present invention provides a method for blind separation of independent source signals. The preceding is accomplished by disclosing new techniques for dealing with the problem of blind separation of independent source signals. The method of the present invention consists of identifying a simple constrained criterion which stems directly from derived conditions for source separation. Using this criterion, observed and output signals are used to control a filtering matrix. After being initialized, the filtering matrix is updated and projected to the closest unitary matrix. Until the filtering matrix has converged, it continues to be updated and projected to the closest unitary matrix. Once convergence has occurred, the source signals have been recovered.

20 Claims, 2 Drawing Sheets

METHOD AND SYSTEM FOR BLIND SEPARATION OF INDEPENDENT SOURCE SIGNALS

FIELD OF THE INVENTION

The present invention relates generally to the recovery of independent user signals simultaneously transmitted through a linear mixing channel, and more particularly, to a method and system for blind recovery of a number of independent user signals.

BACKGROUND OF THE INVENTION

In many signal processing applications, the sample signals provided by the sensors are mixtures of many unknown sources. The "separation of sources" problem is to extract the original unknown signals from these known mixtures. Generally, the signal sources as well as their mixture characteristics are unknown. Without knowledge of the signal sources other than the general statistical assumption of source independence, this signal processing problem is known in the art as the "blind source separation problem". The separation is "blind" because nothing is known about the values of the independent source signals and nothing is known about the mixing process (which is assumed to be linear).

The blind separation problem is encountered in many familiar forms. For instance, the well-known "cocktail party" problem refers to a situation where the unknown (source) signals are sounds generated in a room and the known (sensor) signals are the outputs of several microphones. Each of the source signals is delayed and attenuated in some (time varying) manner during transmission from source to microphone, where it is then mixed with other independently delayed and attenuated source signals, including multipath versions of itself (reverberation), which are delayed versions arriving from different directions. A person, however, generally wishes to listen to a particular set of sound source while filtering out other interfering sources, including multi-path signals.

This signal processing problem arises in many contexts other than the simple situation where each of two mixtures of two speaking voices reaches one of two microphones. Other examples involving many sources and many receivers include the separation of radio or radar signals sensed by an array of antennas, sonar array signal processing, image deconvolution, radio astronomy, and signal decoding in cellular telecommunication systems. Those skilled in the signal processing arts have been eager to solve blind source separation problems because of their broad application to many communication fields. Solutions to date, however, are time intensive, require extensive computing power, and the source signal separation is not ideal.

SUMMARY OF THE INVENTION

The present invention broadly contemplates systems and methods for blind source separation based on the identification of a set of conditions which are necessary and sufficient for the separation of the source signals and which any method used for blind source separation must satisfy. Preferably, an optimization technique is used to enforce these conditions to separate and recover the source signals. This approach achieves better signal separation than known processes, and the optimization reduces the time and computing needed to separate the source signals.

In accordance with the present invention, a simple constrained criterion which stems directly from derived conditions for source separation is identified. Using this criterion, observed, i.e., first signals, and output signals are used to control a filtering matrix. After being initialized, the filtering matrix is updated and projected to the closest unitary matrix. Until the filtering matrix has converged, it continues to be updated and projected to the closest unitary matrix. Once convergence has occurred, the source signals have been recovered.

DETAILED DESCRIPTION

Figure 1:
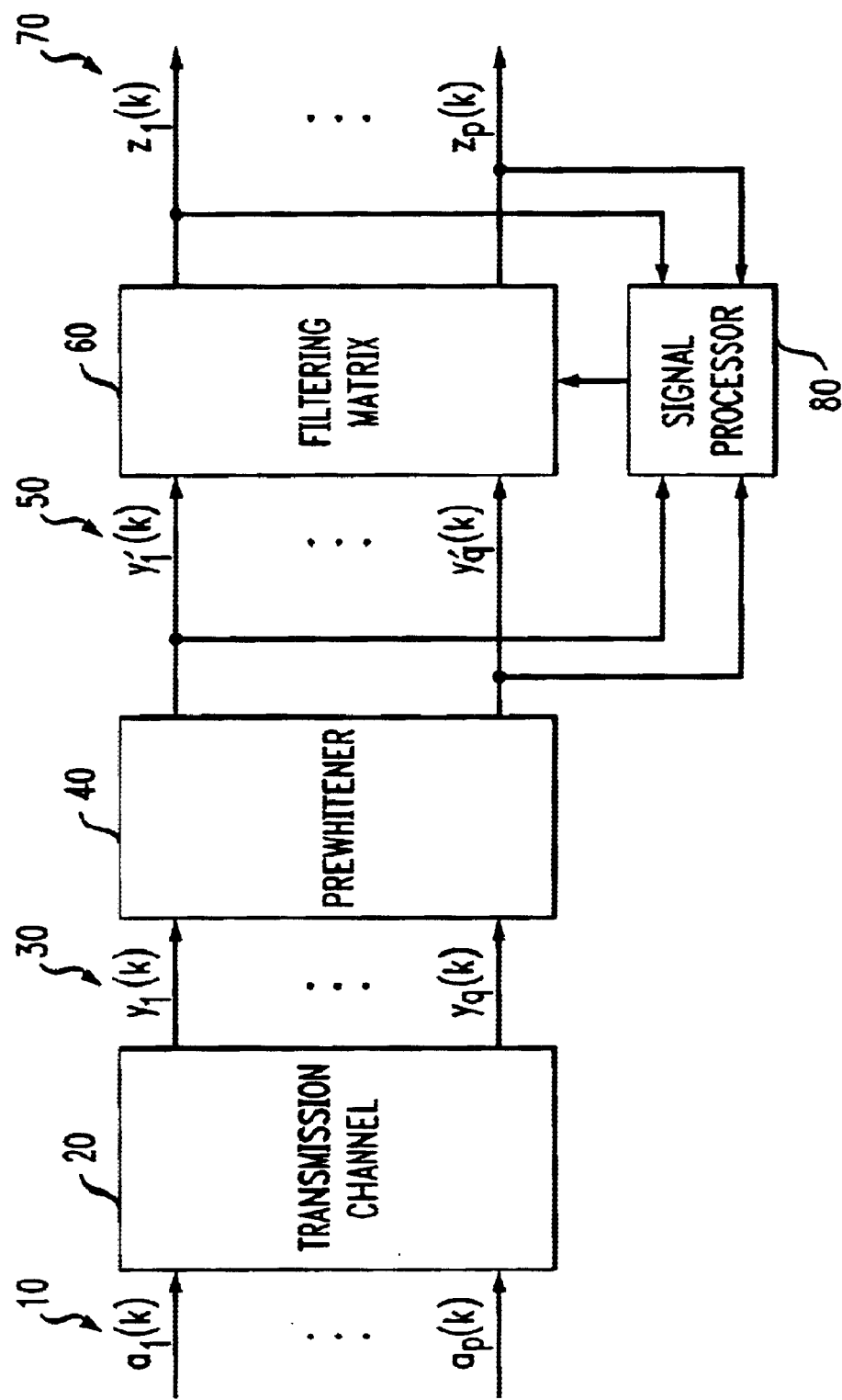
FIG. 1 shows a block diagram of the elements in a system utilized for blind separation of independent source signals in accordance with the present invention.

Referring to the block diagram of the elements in a system utilized for blind separation of independent source signals in accordance with the present invention shown in FIG. 1, source or transmitted signals 10 are preferably p i.i.d. and mutually independent zero-mean discrete-time sequences $a_i(k)$ i=1, ... ,p that share the same statistical properties. The source signals pass through transmission channel 20, typically a p×q multiple-input-multiple-output (MIMO) linear memoryless channel which introduces interuser interference (IUI). Received signals 30 are inputted into pre-whitener 40, resulting in observed or sensed signals 50. Received signals 30 and sensed signals 50 may be written as Y(k) and Y'(k), respectively. Sensed signals 50 are then subsequently filtered by a q×p filtering matrix 60 whose outputs, output signals 70, $z_j(k)$, j=1, ... ,p should ideally match the source signals $a_i(k)$ when the proper filtering matrix 60 is used. To determine the proper filtering matrix 60, output signals 70 are inputted, together with sensed signals 50, into signal processor 80, which controls filtering matrix 60.

Source signal separation is achieved for both multiple user equalization and single user equalization when the filtering matrix 60 is selected such that it satisfies certain, in each case, conditions. Determining the proper equalizer setting in the case of single user equalization is a special case of multiple user equalization. The conditions to be satisfied in accordance with the present invention are as follows:

$$|K(z_j(k))|=|K_a|, j=1, \ldots, p \quad \text{(C1)}$$

$$E|z_j(k)|^2=\sigma_a^2, j=1, \ldots, p \quad \text{(C2)}$$

$$E(z_i(k)z_j^*(k))=0, i \neq j \quad \text{(C3)}$$

E denotes the statistical expectation. For a detailed discussion of the derivation of these conditions, the reader is referred to the details which follow.

The only provision for an appendix is under rule 37 CFR 1.96 for reference to computer program listings which must be provided on CD. The reference to an Appendix was removed to avoid confusion and to avoid mis-treatment of pages 12–16 to ensure that they are properly printed as part of the specification.

$$\begin{cases} \max_{G} & F(G) = \sum_{j=1}^{p} |K(z_j)| \\ \text{subject to:} & G^H G = I \end{cases} \quad (1)$$

where I is the p×p identity matrix and H denotes the Hermitian (or else complex conjugate) transpose. The constraint in (1) comes from the fact that, according to (C2) and (C3), $$E(zz^H) = \sigma_a^2 I \quad (2)$$

(It is assumed for simplicity that $\sigma_a^2 = 1$) In accordance with the present invention, (1) is the preferred maximization criterion. The global optima of this preferred criterion achieve blind recovery.

The p×q channel matrix is denoted by C and the q×1 channel output vector by Y(k). Although denoted Y(k), it is preferred this channel output be "pre-whitened" in both "space" and time by pre-whitener 40. Thus, channel output Y(k) corresponds to sensed signal 50. The sensed signal model is then:

$$Y(k) = C^T A(k) + n(k) \quad (3)$$

where $Y(k) = [y_1(k) \ldots y_q(k)]^T$ and n(k) is the q×1 vector of additive noise samples. The receiver output, sensed signal 50, can then be written as $$z(k) = W^T(k)Y(k) = W^T(k)C^T A(k) + n'(k) = G^T(k)A(k) + n'(k) \quad (4)$$

where W(k) and G(k)=CW(k) are the q×p receiver matrix and p×p global response matrix, respectively, and $n'(k) = W^T(k)n(k)$ is the colored noise at the receiver output, all at time instant k.

Figure 2:
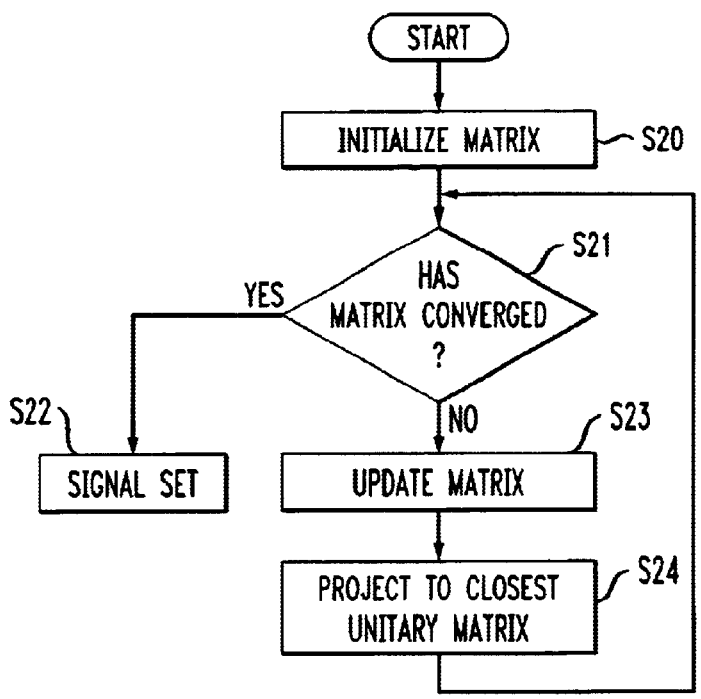
FIG. 2 shows a flow chart describing a method for blind separation of independent source signals in accordance with an illustrative embodiment of the present invention.

FIG. 2 illustrates a flow chart of the steps executed by the signal processor 80 in determining the proper filtering matrix 60, in accordance with the technique of the present invention, which may be referred to as a multi-user kurtosis (MUK) algorithm for blind source separation. Step S20 involves initializing filtering matrix 60, that is for k=0, setting W(0)=W$_0$. This is accomplished by first computing the gradient of F(G) with respect to W. By writing F(G) as $$F(G) = \sum_{j=1}^{p} \text{sign}(K(z_j))K(z_j)$$

$$= \text{sign}(K_a) \sum_{j=1}^{p} \left( E|z_j|^4 - 2E^2|z_j|^2 - |E(z_j^2)|^2 \right)$$

and assuming symmetrical inputs ($E(a_i^2(k))=0$), the gradient of F(G) with respect to W equals $$\nabla(F(G)) = 4 \sum_{j=1}^{p} E(|z_j(k)|^2 z_j(k) Y^*(k)) \quad (5)$$

At Step S21, for k>0, it is determined if the matrix has converged. If the matrix has converged, the recovered signals outputted in Step S22 are very close to the input signals. If convergence has not occurred, the filtering matrix is updated in Step S23. In accordance with the present invention, W(k) is updated in the direction of the in stantaneous gradient (dropping the expectation operator in (5)) as follows:

$$W(k+1) = W(k) + \mu \, \text{sign}(K_a) Y^*(k) Z(k) \quad (1)$$

where $$Z(k) = [|z_1(k)|^2 z_1(k) \ldots |z_p(k)|^2 z_p(k)] \quad (2)$$

and $\mu$ is the algorithm's step size. The orthogonality constraint needs to be satisfied at the next iteration of the algorithm:

$$G^H(k+1)G(k+1) = I \quad (3)$$

For this to be feasible, it is necessary for the channel output to be "pre-whitened" in both "space" and time. This corresponds to assuming the channel matrix C to be unitary, which is achieved by the pre-whitener 40 in FIG. 1. Assuming that C is unitary, to satisfy the constraint (8) it suffices to satisfy $$W^H(k+1)W(k+1) = I \quad (4)$$

Because there is no guarantee that W'(k+1) will satisfy the constraint (9), it must be hence transformed to a unitary W(k+1)=f(W'(k+1)).

Preferably, W(k+1) is chosen to be a q×p matrix which is as close as possible to W'(k+1) in the Euclidean sense. Dropping the time index for convenience, this can be achieved with an iterative procedure which satisfies the following criterion successively for j=1, . . . , p:

$$\begin{cases} \min_{w_j} & \Delta(W_j) = \|W_j - W_j'\|^2 \\ \text{subject to:} & W_l^H W_j = \delta_{lj}, l = 1, \ldots, j \end{cases} \quad (10)$$

where $\|X\|^2 = X^H X$ is the squared Euclidean norm of vector X and where W' is defined from $$W' = [W'_1 \ldots W'_p] \quad (11)$$

The problem (10) can also be written as $$\begin{cases} \min_{w_j} & \Delta(W_j) = (W_j - W_j')^H (W_j - W_j') \\ \text{subject to:} & W_l^H W_j = \delta_{lj}, l = 1, \ldots, j \end{cases} \quad (12)$$

To solve the problem (12) the Lagrangian of $\Delta(W_j)$ is constructed, which equals $$\mathcal{L}_\Delta(W_j, \lambda_j, \mu, v) = \Delta(W_j) - \lambda_j(W_j^H W_j - 1) - \sum_{l=1}^{j-1} \mu_{lj} \text{Re}(W_l^H W_j) - \sum_{l=1}^{j-1} v_{lj} \text{Im}(W_l^H W_j) \quad (13)$$

where $\lambda_j$, $\mu_{lj}$, $v_{lj}$ are real scalar parameters. Setting the gradient of $\mathcal{L}_\Delta(W_j, \lambda_j, \mu, v)$ with respect to $W_j$ to zero $$\left( \frac{\partial \mathcal{L}_\Delta}{\partial W_j^*} = 0 \right),$$

the following are obtained for each j:

$$W_j - W_j' - \lambda_j W_j - \sum_{l=1}^{j-1} \beta_{lj} W_l = 0 \quad (14)$$

where $\beta_{lj} = \frac{1}{2}(\mu_{lj} + \sqrt{-1} v_{lj})$. From (14)

$$\begin{cases} \lambda_j = 1 - W_j^H W_j' \\ \beta_{ij} = -W_i^H W_j' \end{cases} \quad (15)$$

is obtained, which gives $$(1-\lambda_j)W_j = W_j' - \sum_{l=1}^{j-1}(W_l^H W_j')W_l \quad (16)$$

According to (16), $$W_j \propto \left(W_j' - \sum_{l=1}^{j-1}(W_l^H W_j')W_l\right) \quad (17)$$

where $\propto$ denotes "proportional". In light of (17), and keeping in mind that $W_j^H W_j = 1$, $W_j$ (bringing back the time index) must be chosen as:

$$W_j(k+1) = \frac{W_j'(k+1) - \sum_{l=1}^{j-1}(W_l^H(k+1)W_j'(k+1))W_l(k+1)}{\left\|W_j'(k+1) - \sum_{l=1}^{j-1}(W_l^H(k+1)W_j'(k+1))W_l(k+1)\right\|} \quad (18)$$

Figure 3:
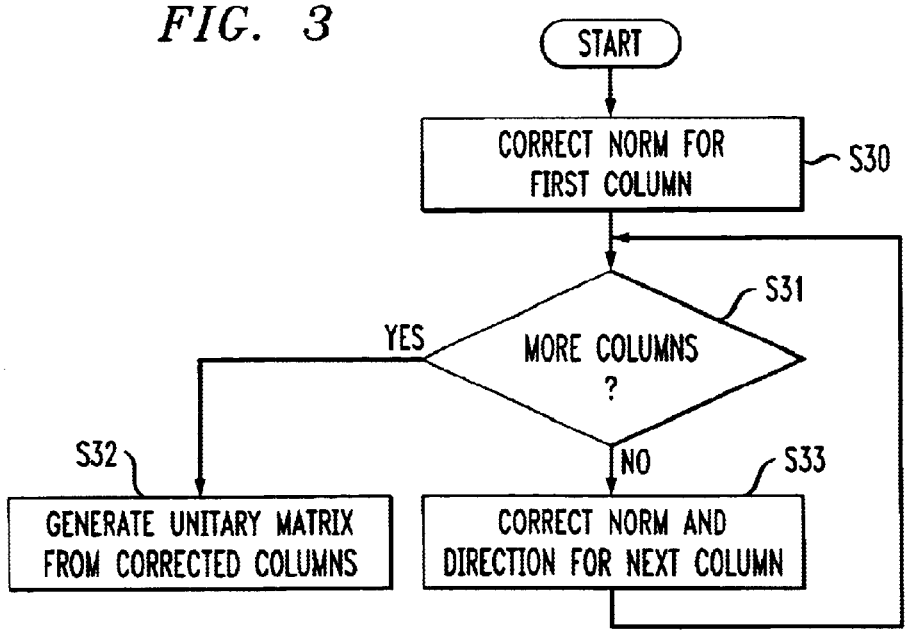
FIG. 3 shows a flow chart describing the preferred manner in which the projection to the closest unitary matrix is accomplished in accordance with an illustrative embodiment of the present invention.

The updated filtering matrix is then projected to the closest unitary matrix in Step S24. FIG. 3 illustrates a flow chart of the steps taken in projecting the filtering matrix to the closet unitary matrix in Step S24. In Step S30, the norm of the first column of the updated filtering matrix 60 is corrected, that is $$W_1(k+1) = \frac{W_1'(k+1)}{\|W_1'(k+1)\|}$$

In Step S31 it is determined if there are more columns in the filtering matrix whose norm needs to be corrected. If not, a unitary filtering matrix is generated from the corrected columns in Step S32, according to equation (12). If so, the norm for the next column is corrected, that is: $W_j(k+1)$ is computed in accordance with Equation (18).

Steps S30–33 correspond to a Gram-Schmidt orthogonalization of $W'(k+1)$. The projection described by steps S30–33 would reduce to the mere normalization of Step 530 in the case of a single user. Also, if the transmitted input is non-symmetrical, equation (6) should use instead of Z(k) in (7) the following vector:

$$Z'(k) = [|z_1(k)|^2 z_1(k) - <z_1^2(k)>z_1^*(k) \ldots |z_p(k)|^2 z_p(k) - <z_p^2(k)>z_p^*(k)]^T \quad (19)$$

where < > denotes empirical averaging.

The system of the present invention includes an input signal receiver, a filtering matrix, a signal processor, and a convergence detector, which may be implemented on a suitably programmed general purpose computer. These may also be implemented on an Integrated Circuit, part of an Integrated Circuit, or parts of different Integrated Circuits. Thus, it is to be understood that the invention may be implemented in hardware, software, or a combination of both. Accordingly, the present invention includes a program storage device readable by machine, tangibly embodying a program of instructions executable by the machine to perform any of the method steps herein described for performing blind source separation of independent source signals.

Such method steps could include, for example, receiving an input signal which is the result of an independent source signal having passed through a transmission channel; pre-whitening said input signal to obtain an observed signal; inputting said input signal into a filtering matrix to obtain a recovered signal; utilizing said observed signal and said recovered signal to update said filtering matrix; projecting said updated filtering matrix to the closest unitary matrix, outputting a signal representing said independent source signal when said recovered signal has converged, when said recovered signal has not converged, employing said closest unitary matrix as a new filtering matrix and continuing to input said input signal into a filtering matrix to obtain a recovered signal, utilizing said observed signal and said recovered signal to update said filtering matrix, projecting said updated filtering matrix to the closest unitary matrix, and outputting a signal representing said independent source signal when said recovered signal has converged.

Again, it is to be emphasized that any of the method steps, in any combination, can be encoded and tangibly embodied on a program storage device according to the present invention.

While only certain features of the invention have been illustrated and described herein, many modifications, substitutions, changes or equivalents will now occur to those skilled in the art. It is therefore intended to be understood that the appended claims are intended to cover all such modifications and changes that fall within the true spirit of the invention.

Multiple User Equalization

The equalizer output signals, $z_j(k)$, $j=1, \ldots, p$ can be written as a function of the source signals $a_i(k)$, $i=1, \ldots, p$ as follows:

$$z_j(k) = \sum_{l=1}^{p} g_{jl}a_l(k) = G_j^T A(k), \, j = 1, \ldots, p \quad (20)$$

where $A(k) = [a_1(k) \ldots a_p(k)]^T$. $G_j$ is the channel/equalizer cascade that contains the contribution of all the p channel inputs to the j-th equalizer output, and T denotes matrix transpose. Equation (20) can be also written in the familiar form $$z(k) = [z_1(k) \ldots z_p(k)]^T = G^T A(k) \quad (21)$$

where $$G = [G_1 \ldots G_p] = \begin{bmatrix} g_{11} & \cdots & g_{p1} \\ \vdots & \vdots & \vdots \\ g_{1p} & \cdots & g_{pp} \end{bmatrix} \quad (22)$$

The above-described linear mixture setup can be used to model narrowband antenna-array systems, code division multiple access (CDMA) systems, or oversampled systems.

Each output's power and kurtosis may be expressed as:

$$E(|z_j(k)|^2) = \sigma_a^2 \sum_{l=1}^{p} |g_{jl}|^2, \, j = 1, \ldots, p \quad (23)$$

-continued $$K(z_j) = K_a \sum_{l=1}^{p} |g_{jl}|^4, \; j=1, \ldots, p \quad (24)$$

respectively $K_a$ is the (unnormalized) kurtosis and $\sigma_a^2$ the variance of each $a_j(k)$ (since they are all assumed to share the same distribution), defined as $$K_a = K(a_j(k))$$
$$\sigma_a^2 = E(|a_j(k)|^2) \quad (25)$$

where $K(x) = E(|x|^4) - 2E^2(|x|^2) - |E(x^2)|^2$.

Single User Equalization

Determining the proper equalizer setting in the case of single user equalization of intersymbol interference channels (ISI) channels is a special case of multiple user equalization. The single equalizer output may be written as $z(k) = G^T A(k)$, where G is a (possibly infinite-length) column vector containing the coefficients of the channel impulse response. Similar to equations (23) and (24), the output power and kurtosis for a single equalizer output are $$E(|z_j(k)|^2) = \sigma_a^2 \sum_{l \in P} |g_l|^2 \quad (26)$$

$$K(z(k)) = K_a \sum_{l \in P} |g_l|^4 \quad (27)$$

where P is a subset of the set of integers. Based on these expressions, the following set of conditions are necessary and sufficient for BE:

$$\begin{cases} |K(z(k))| = K_a \\ E|z(k)|^2 = \sigma_a^2 \end{cases} \quad (28)$$

which stems from the fact that $$\sum_{l \in P} |g_l|^4 \leq \left( \sum_{l \in P} |g_l|^2 \right)^2 \quad (29)$$

Equality in (29) holds only in the case that there exists a unique nonzero element $g_l$ of unit magnitude for some $l \in P$. Based on the condition (28), the following constrained optimization problem has been suggested for BE $$\begin{cases} \max_G \; F_{SW}(G) = |K(z_j)| \\ \text{subject to:} \quad G^H G = 1 \end{cases} \quad (30)$$

An important result about the behavior of criterion (11) is that the cost function $F_{SW}(G)$ is free of undesired local maxima on $G^H G = 1$ if G is infinite-length. This makes the corresponding algorithm for BE globally convergent to a "Dirac" solution, that is a solution with a single non-zero element (up to a scalar phase shift). Moreover, the popular Constant Modulus Algorithm (CMA) 2—2 can be seen as a special case of constrained optimization criteria when the input is sub-Gaussian, thus it reflects the global convergence property as well.

Linear Instantaneous Mixture Case

As is typical in blind equalization, the method of the present invention permits each transmitted signal to be recovered up to a unitary scalar rotation. This is due to the inherent inability of statistical blind techniques to distinguish between different rotated versions of the input signals. Therefore, blind recovery will be achieved if (after suitable reordering of the equalizer outputs) the following holds:

$$z_j(k) = e^{-1 \phi_j} a_j(k) \quad (31)$$

for some $\phi_j \in [0, 2\pi)$ and all $j \in \{1, \ldots, p\}$.

Based on (23) and (24), if each $a_i(k)$, $i=1, \ldots, p$ is an i.i.d. zero-mean sequence, $\{a_i(k)\}$, $\{a_j(k)\}$ are statistically independent for $i \neq j$ and share the same statistical properties, then the following set of conditions are necessary and sufficient for the recovery of all the transmitted signals at the equalizer outputs:

$$|K(z_j(k))| = |K_a|, \; j=1, \ldots, p \quad (C1)$$
$$E|z_j(k)|^2 = \sigma_a^2, \; j=1, \ldots, p \quad (C2)$$
$$E(z_i(k) z_j^*(k)) = 0, \; i \neq j \quad (C3)$$

To achieve perfect recovery (31) must hold, from which (C1) and (C2) follow immediately and (C3) follows since $E(a_i(k) a_j^*(k)) = 0$ for $i \neq j$ (* denotes complex conjugate).

From (24) and (C1), the following is obtained:

$$\sum_{l=1}^{p} |g_{jl}|^4 = 1 \quad (32)$$

From (23) and (C2), the following is obtained:

$$\sum_{l=1}^{p} |g_{jl}|^2 = 1 \quad (33)$$

Therefore, equations (32) and (33) dictate, in the light of (29), that $G_j$ must be of the form $$G_j = [\ldots \; e^{\sqrt{-1} \phi_j} \ldots]^T \quad (34)$$

where the single non-zero element can be at any position. Combining (C3) with (21) gives:

$$G_i^H G_j = 0, \; i \neq j \quad (35)$$

where H denotes the Hermitian (or else complex conjugate) transpose. According to (34) and (35), if $G_j$'s non-zero element is at position n, then $G_i$ cannot have its non-zero element at position n. Hence, the p different "Dirac"-type vectors $G_j$ of the form (34) will all contain their unique nonzero elements at different positions. This corresponds to the recovery of all the p different inputs $a_j(k)$. Therefore, after re-ordering, (31) is obtained and perfect signal separation (in the above sense) has been achieved.

What is claimed is:

1. A method for blind separation of independent source signals, comprising the steps of:
   (a) receiving a plurality of input signals which is the result of a plurality of independent source signals having passed through a transmission channel;
   (b) spatially prewhitening said plurality of input signals to satisfy a prescribed orthogonality constraint and to generate a plurality of first signals;
   (c) employing a filtering matrix supplied with said plurality of first signals to produce a plurality of recovered signals;
   (d) updating said filtering matrix in response to said plurality of first signals and said plurality recovered signals;

(e) projecting said updated filtering matrix to the closest unitary filtering matrix;

(f) outputting said plurality of recovered signals as representations of said plurality of independent source signals when said updated filtering matrix has converged;

(g) when said updated filtering matrix has not converged, employing said closest unitary matrix as a new filtering matrix in step (c) and repeating appropriate ones of steps (c) through (g) until said filtering matrix has sufficiently converged.

2. The method of claim 1, wherein said filtering matrix includes a plurality of columns beginning with a first column and said step (e) comprises the steps of:

correcting a prescribed norm for the first column of said updated filtering matrix; and successively correcting the prescribed norm and direction for at least one subsequent column to said first column of said updated filtering matrix until no uncorrected columns remain to be corrected in said updated filtering matrix.

3. The method as defined in claim 2, wherein said norm is the Euclidean norm of a prescribed vector X.

4. The method as defined in claim 2 wherein said filtering matrix, W(k), is updated in accordance with $$W(k+1)=W(k)+\mu \, \text{sign}(K_a)Y^*(k)Z(k),$$

where $$Z(k)=[|z_1(k)|^2 z_1(k) \ldots |z_p(k)|^2 z_p(k)],$$

$\mu$ is the step size, W(k) is the current filtering matrix and W'(k+1) is the updated filtering matrix.

5. The method as defined in claim 2 wherein the norm of each of the columns in the undated filtering matrix is corrected in accordance with, $$W_j(k+1) = \frac{W'_j(k+1) - \sum_{l=1}^{j-1} (W_l^H(k+1)W'_j(k+1))W_l(k+1)}{\left\| W'_j(k+1) - \sum_{l=1}^{j-1} (W_l^H(k+1)W'_j(k+1))W_l(k+1) \right\|},$$

where j is the column number, $W_l$ is the updated filtering matrix, $W_l^H$ is the Hermitian (or complex conjugate) transpose of the filtering matrix, and wherein the norm of the first column in said filtering matrix is corrected in accordance with $$W_1(k+1) = \frac{W'_1(k+1))}{\|W'_1(k+1)\|}.$$

6. A method of producing a plurality of output signals ($z_p(k)$), where p=1, ... P, each said output signal $z_p(k)$ corresponding to one of a plurality of source signals ($a_p(k)$), said method comprising the steps of:

(a) receiving a plurality of input signals ($y_q(k)$), where q=1, ... Q, which is the result of a plurality of source signals ($a_p(k)$) having passed through a transmission channel;

(b) spatially prewhitening said plurality of input signals ($y_q(k)$) to satisfy a prescribed orthogonality constraint and to generate a plurality of fist signals ($y'_q(k)$);

(c) employing a filtering matrix (W(k)) supplied with said plurality of first signals ($y'_q(k)$) to produce a plurality of recovered signals ($z_p(k)$);

(d) updating said filtering matrix (W(k)) to W'(k+1) in response to said plurality of first signals ($y'_q(k)$) and said plurality of recovered signals ($z_p(k)$);

(e) projecting said updated filtering matrix to the closest unitary filtering matrix;

(f) outputting said plurality of recovered signals as signal representations corresponding to said plurality of source signals ($a_p(k)$) when said filtering matrix has converged; and (g) when said updated filtering matrix has not converged, employing said closest unitary matrix as a new filtering matrix W(k+1) in step (c) and repeating appropriate ones of steps (c) through (g) until such time that said filtering matrix has sufficiently converged.

7. The method of claim 6, wherein said filtering matrix includes a plurality of columns beginning with a first column and said step (e) comprises the steps of:

correcting a prescribed norm for the first column of said updated filtering matrix; and successively correcting the norm and direction for at least one subsequent column to said first column of said updated filtering matrix until no uncorrected column remains in said updated filtering matrix.

8. The method as defined in claim 6 wherein $P \leq Q$, the receiver has one or more antenna, and q is the number of receiver antenna.

9. A system for blind separation of a plurality of independent source signals comprising:

a receiver which receives a plurality of input signals that is the result of a plurality of independent source signals that has passed through a transmission channel;

a pre-whitener which spatially pre-whitens said plurality of input signals to satisfy a prescribed orthogonality constraint and to generate a plurality of first signals;

a filtering matrix supplied with said plurality of first signals to produce a plurality of recovered signals;

a signal processor, supplied with said plurality of first signals and said plurality of recovered signals, being adapted to update said filtering matrix and to project; said updated filtering matrix to the closest unitary filtering matrix; and a convergence detector which controls the signal processor such that the signal processor continues to process said plurality of first signals and said plurality of recovered signals until said filtering matrix sufficiently converges and said plurality of recovered signals is outputted as representations of said plurality of independent source signals, wherein said closest unitary matrix becomes a new current filtering matrix upon said plurality of first signals and said plurality of recovered signals being processed.

10. The system of claim 9 wherein said filtering matrix includes a plurality of columns and in which said signal processor projects the updated filtering matrix to the closest unitary matrix by correcting the norm for the first column of said updated filtering matrix and successively correcting the norm and direction for at least one subsequent column to said first column of said updated filtering matrix until no uncorrected column remains in said updated filtering matrix.

11. The system as defined in claim 10, wherein said norm is the Euclidean norm of a prescribed vector.

12. The system as defined in claim 10 wherein said filtering matrix, W(k), is updated in accordance with $$W(k+1)=W(k)+\mu \, \text{sign}(K_a)Y^*(k)Z(k),$$

where $$Z(k)=[|z_1(k)|z_1(k) \ldots |z_p(k)|^2 z_p(k)],$$

$\mu$ is the step size, W(k) is the current filtering matrix and W'(k+1) is the updated filtering matrix.

13. The method as defined in claim 10 wherein the norm of each of the columns in the undated filtering matrix is corrected in accordance with, $$W_j(k+1) = \frac{W'_j(k+1) - \sum_{i=1}^{j-1}(W_i^H(k+1)W'_j(k+1))W_i(k+1)}{\left\|W'_j(k+1) - \sum_{i=1}^{j-1}(W_i^H(k+1)W'_j(k+1))W_i(k+1)\right\|},$$

where j is the column number, $W_i$ is the updated filtering matrix, $W_i^H$ is the Hermitian (or complex conjugate) transpose of the filtering matrix, and wherein the norm of the first column in said filtering matrix is corrected in accordance with $$W_1(k+1) = \frac{W'_1(k+1)}{\|W'_1(k+1)\|}.$$

14. A system for producing a plurality of output signals ($z_p(k)$), where p=1, ... P, each said output signal $z_p(k)$ corresponding to one of a plurality of source signals ($a_p(k)$), comprising;
   a receiver which receives a plurality of input signals ($y_q(k)$), where q=1, ... Q, which is the result of a plurality of source signals ($a_p(k)$) having passed through a transmission channel;
   a pre-whitener that spatially pre-whitens said plurality of input signals ($y_q(k)$) to satisfy a prescribed orthogonality constraint and to generate a plurality of first signals ($y'_q(k)$);
   a signal processor which applies a filtering matrix (W(k)) to said plurality of first signals ($y'_q(k)$) to produce a plurality of recovered signals ($z_p(k)$), utilizes said plurality of first signals ($y'_q(k)$) and said plurality of recovered signals ($z_p(k)$) to update said filtering matrix (W(k)) to W'(k+1), and projects said updated filtering matrix to the closest unitary filtering matrix; and
   a convergence detector which controls the signal processor such that the signal processor continues to process said plurality of first signals ($y'_q(k)$) and plurality of recovered signals ($z_p(k)$) until said filtering matrix is sufficiently converged and said plurality of recovered signals ($z_p(k)$) is outputted as representations of said plurality of source signals ($a_p(k)$), wherein said closest filtering matrix becomes a new current filtering matrix W(k+1) upon said plurality of first signals ($y'_q(k)$) and said plurality of recovered signals ($z_q(k)$) being processed.

15. The system of claim 14 wherein said filtering matrix includes a plurality of columns and in which said signal processor projects the updated filtering matrix to the closest unitary filtering matrix by correcting the norm for the first column of said updated filtering matrix and successively correcting the norm and direction for at least one subsequent column of said updated filtering matrix until no uncorrected column remains in said updated filtering matrix.

16. A program storage device readable by a machine, tangibly embodying a program of instructions executable by the machine to perform method steps for providing blind separation of a plurality of independent source signals, said method steps comprising:
   receiving a plurality of input signals which is the result of a plurality of independent source signals having passed through a transmission channel;
   spatially pre-whitening said plurality of input signals to satisfy a prescribed orthogonality constraint and to generate a plurality of first signals;
   employing a filtering matrix supplied with said plurality of first signals to produce a plurality of recovered signals;
   updating said filtering matrix in response to said plurality of first signals and said plurality of recovered signals;
   projecting said updated filtering matrix to the closest unitary filtering matrix;
   outputting said plurality of recovered signals as representations of said plurality of independent source signals when said filtering matrix has converged; and
   when said filtering matrix has not converged, employing said closest unitary filtering matrix as a new current filtering matrix in step (c) and continuing to input said plurality of input signals into said filtering matrix to obtain a plurality of recovered signals, utilizing said plurality of first signals and said plurality of recovered signals to update said filtering matrix, projecting said updated filtering matrix to the closest unitary filtering matrix, and outputting said plurality of recovered signals as representations of said plurality of independent source signals when said filtering matrix has converged.

17. The method of claim 16, wherein said filtering matrix includes a plurality of columns beginning with a first column and said step of projecting comprises the steps of:
   correcting a prescribed norm for the first column of said updated filtering matrix; and
   successively correcting the prescribed norm and direction for at least one subsequent column to said fist column of said updated filtering matrix until no uncorrected column remains in said updated filtering matrix.

18. The method as defined in claim 17, wherein said norm is the Euclidean norm of a prescribed vector.

19. The method as defined in claim 17 wherein said filtering matrix, W(k), is updated in accordance with $$W(k+1)=W(k)+\mu \, \text{sign}(K_a)Y^*(k)Z(k),$$

where $$Z(k)=[|z_1(k)|^2 z_1(k) \ldots |z_p(k)|^2 z_p(k)],$$

$\mu$ is the step size, W(k) is the current filtering matrix and W'(k+1) is the updated filtering matrix.

20. The method as defined in claim 17 wherein the norm of each of the columns in the undated filtering matrix is corrected in accordance with, $$W_j(k+1) = \frac{W'_j(k+1) - \sum_{l=1}^{j-1} (W_l^H(k+1)W'_j(k+1))W_l(k+1)}{\left\| W'_j(k+1) - \sum_{l=1}^{j-1} (W_l^H(k+1)W'_j(k+1))W_l(k+1) \right\|},$$

where j is the column number, $W_j$ is the updated filtering matrix, $W_l^H$ is the Hermitian (or complex conjugate) transpose of the filtering matrix, and wherein the norm of the first column in said filtering matrix is corrected in accordance with $$W_1(k+1) = \frac{W'_1(k+1)}{\|W'_1(k+1)\|}.$$

* * * * *